(12) United States Patent
Boeltl

(10) Patent No.: US 12,540,458 B2
(45) Date of Patent: Feb. 3, 2026

(54) WATER PROVIDING STATION

(71) Applicant: Acorn Engineering Company, City Of Industry, CA (US)

(72) Inventor: Darryl M. Boeltl, Whittier, CA (US)

(73) Assignee: Acorn Engineering Company, City of Industry, CA (US)

( * ) Notice: Subject to any disclaimer, the term of this patent is extended or adjusted under 35 U.S.C. 154(b) by 373 days.

(21) Appl. No.: 17/859,267

(22) Filed: Jul. 7, 2022

(65) Prior Publication Data

US 2023/0027542 A1 Jan. 26, 2023

Related U.S. Application Data

(63) Continuation-in-part of application No. 16/941,043, filed on Jul. 28, 2020, now Pat. No. 12,410,592.

(51) Int. Cl.
*E03B 9/20* (2006.01)

(52) U.S. Cl.
CPC ..................................... *E03B 9/20* (2013.01)

(58) Field of Classification Search
CPC .. E03B 9/20; E03B 7/07; B01D 29/13; B01D 35/306; B01D 2201/04; B01D 2201/4092; B01D 27/08; B01D 2201/0423; B01D 2201/303; C02F 1/001; C02F 2101/12; C02F 2101/20; C02F 2101/306; C02F 2201/006; C02F 2307/10; C02F 1/003
See application file for complete search history.

(56) References Cited

U.S. PATENT DOCUMENTS

| | | | | |
|---|---|---|---|---|
| 2,033,083 | A | * | 3/1936 | Roberge .................... E03B 9/20 239/29 |
| 4,942,630 | A | * | 7/1990 | Kantor ................... B01D 29/96 4/496 |
| 7,056,435 | B2 | * | 6/2006 | Jenkins .................. B01D 35/30 210/232 |
| 2018/0221794 | A1 | * | 8/2018 | Zhibin ................... B01D 29/96 |

FOREIGN PATENT DOCUMENTS

CA 2971039 A1 * 3/2018 ........... B01D 35/005

* cited by examiner

*Primary Examiner* — Qingzhang Zhou
(74) *Attorney, Agent, or Firm* — Honigman LLP; Eric J. Sosenko; Jonathan P. O'Brien

(57) ABSTRACT

A water providing station having two states of installation. The water providing station includes a housing, a basin supported by the housing, a water dispensing mechanism associated with the basin, an opening defined in the housing, a cover panel removably mounted over the opening in a first installation state and a filter kit removably mounted over the opening in a second installation state. The filter kit including a filter configured to be connected in fluid communication with the water dispensing mechanism.

20 Claims, 8 Drawing Sheets

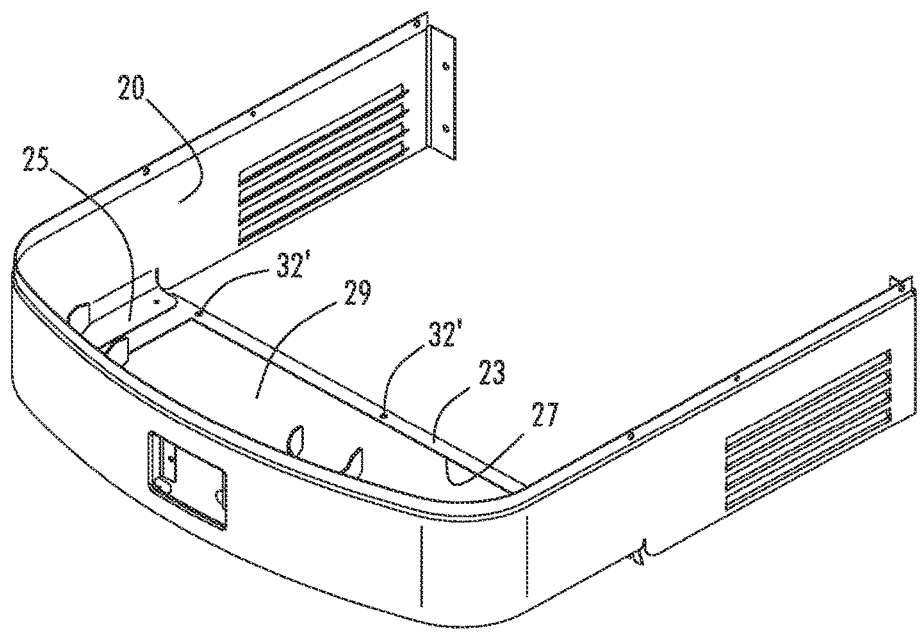
FIG. 2
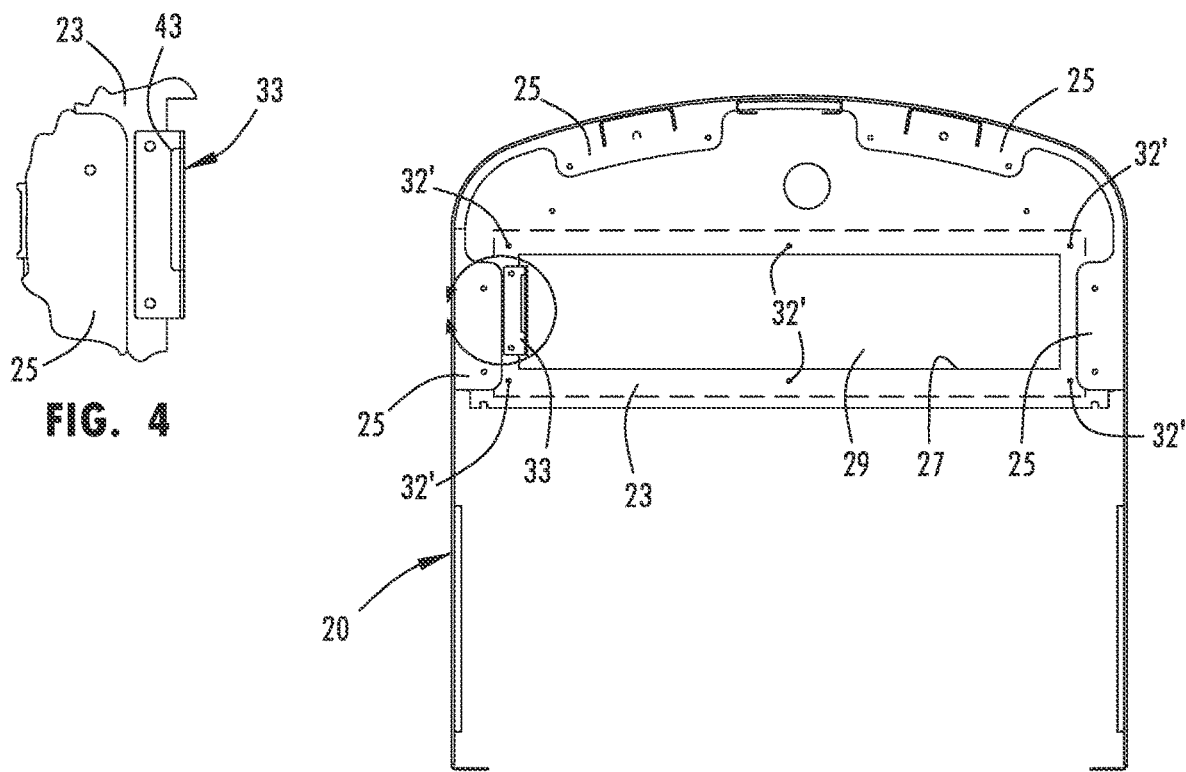
FIG. 4
FIG. 3

WATER PROVIDING STATION

CROSS-REFERENCE TO RELATED APPLICATION

This application is a continuation-in-part of prior application Ser. No. 16/941,043, filed Jul. 28, 2020, the entire contents of which are herein incorporated by reference.

BACKGROUND

1. Field of the Invention

The present invention generally relates to water providing stations, such as drinking fountains, water bottle filling stations and hand washing stations, hereafter just "water stations." More specifically, the invention relates to a water station for use in providing unfiltered or filtered water for drinking, bottle filling, hand washing or other purposes.

2. Description of Related Art

Water stations, such as but not limited to, drinking fountains, water bottle filling stations, hand washing stations, etc., are all coupled to water supplies to provide clean and safe tap water to the user. While such water supplies, typically a municipal water supply, generally provide good and safe water, the quality of the water may and can be improved through additional filtering.

To improve the quality of the water, a variety of filters exist that can be incorporated into a water station. The construction and materials of the filter will vary depending on the particular contaminant(s) that are intended to be removed from the water. Common contaminants that are often of concern include, without limitation, chlorine, lead, mercury, pesticides and herbicides.

One common type of filter is a screw-on filter cartridge. The filter is installed and removed from the water station by incorporating a filter head into the water supply line. The cartridge is provided with integral fittings and a threaded connector thereby allowing the cartridge to be mounted to a corresponding threaded connector provided on the filter head. In this way, the filter can be easily removed from the water supply once its service life is complete and replaced with a new filter.

The replacement of the filter still requires the removal of an access panel from the water station to expose an access opening into the station and to expose the filter. The service technician also must reach through the opening to access the filter, manipulate the filter to release it from the filter head, and retract the filter through the opening. The new filter is similarly installed in a reverse ordered process until the access panel cover is repositioned and secured over the access opening.

While water stations having filters are popular, in certain instances it may desirable to install a water station that does not include a filter. For example, in situations where budget concerns are high, it may be impractical to file water stations incorporation filtration systems. Even in those instances, however, there may be a desire, in the future, to switch to filtered water stations. Replacing in whole the previously installed water stations may again prove to be prohibitive because of budgetary constraints.

SUMMARY

In overcoming the various drawbacks and other limitations of the related art, the present invention provides a water station in which future upgrading of the water station, from one that does not provide filtered water to one that does provide filter water, is made possible by specifically designing the water station to facilitate easy retrofitting with a replaceable filter. This is achieved, in one aspect of the invention, by providing a water station with a replaceable door/panel, wherein the replacement door/panel supports the filter and may be a drop-down door and moveable to provide easy access to the filter once installed.

Accordingly, in one aspect the invention provide a water providing station having two states of installation.

In a second aspect, the invention provides a water providing station that includes a housing, a basin supported by the housing, a water dispensing mechanism associated with the basin, an opening defined in the housing, a cover panel removably mounted over the opening in a first installation state and a filter kit removably mounted over the opening in a second installation state. The filter kit further includes a filter configured to be connected in fluid communication with the water dispensing mechanism.

In another aspect, the housing includes a plurality of mounting features located about the opening and the cover panel includes a plurality of cover mounting features. The plurality of cover mounting features correspond to the plurality of mounting features of the housing. The filter kit includes a plurality of filter kit mounting features that also correspond to the plurality of mounting features of the housing.

In a further aspect, one of a plurality of fasteners extends through each the plurality of mounting features located about the opening and a corresponding one of each the plurality of cover mounting features in the first installation state. In the second installation state, one of the plurality of fasteners extends through each the plurality of mounting features located about the opening and a corresponding one of each the plurality of filter kit mounting features.

In an additional aspect, the cover panel extends completely over the opening in the first installation state.

In yet another aspect, the filter kit extends completely over the opening in the second installation state.

In still a further aspect, the cover panel extends completely over the opening in the first installation state and the filter kit completely extends over the opening in the second installation state.

In an additional aspect, the filter kit includes a mounting frame, a door and a filter. The door is mounted to the mounting frame, and the door is moveable between open and closed positions. The filter is supported by the door for movement with the door between the open and closed positions.

In still another aspect, the filter is fastened to a portion of the door.

In yet a further aspect, the filter includes a filter hub and a filter cartridge. The filter hub is fastened to the door and the filter cartridge is removeable mounted to the filter hub.

In an additional aspect, the mounting frame is configured for mounting to the housing and the door is pivotally engaged to the mounting frame In another aspect, one end of the door is pivotally engaged to the mounting frame and an opposing end of the door is releasably engaged with the housing.

In a further aspect, the door includes a main panel defining an exterior surface, and the exterior surface is substantially flush with an exterior surface of the housing in the closed position.

In an additional aspect, the door includes an end bracket and the filter is fastened to the end bracket.

In still another aspect, the end bracket extends away from the main panel on a side of the main panel opposite from the exterior surface of the main panel.

In yet a further aspect, the door includes lateral flanges extending from the main panel, the door being mounted to the mounting flange through the lateral flanges.

In an additional aspect, the mounting flange includes upstanding flanges extending therefrom, the door being mounted to mounting flange through the upstanding flanges.

In yet another aspect, the perimeter of the cover panel is located outboard of the perimeter of the opening in the first installation state.

In still a further aspect, the perimeter of the filter kit generally corresponds to the perimeter of the cover panel.

In an additional aspect, the perimeter of the filter kit corresponds in size and shape to the perimeter of the cover panel.

In another aspect, the perimeter of the filter kit is located outboard of the perimeter of the opening in the second installation state.

Further objects, features and advantages of this invention will become readily apparent to persons skilled in the art after review of the following description, including the claims, and with reference to the drawings that are appended to and form a part of this specification.

BRIEF DESCRIPTION OF THE DRAWINGS

FIG. 2 is a perspective view of a portion of the water station seen in FIG. 1, with portions removed to show the apron, under panel and cover plate.

FIG. 3 is a top view of FIG. 2;

FIG. 4 is an enlarged view of a portion of FIG. 3 and encircled by line 4-4;

DETAILED DESCRIPTION

Figure 1:
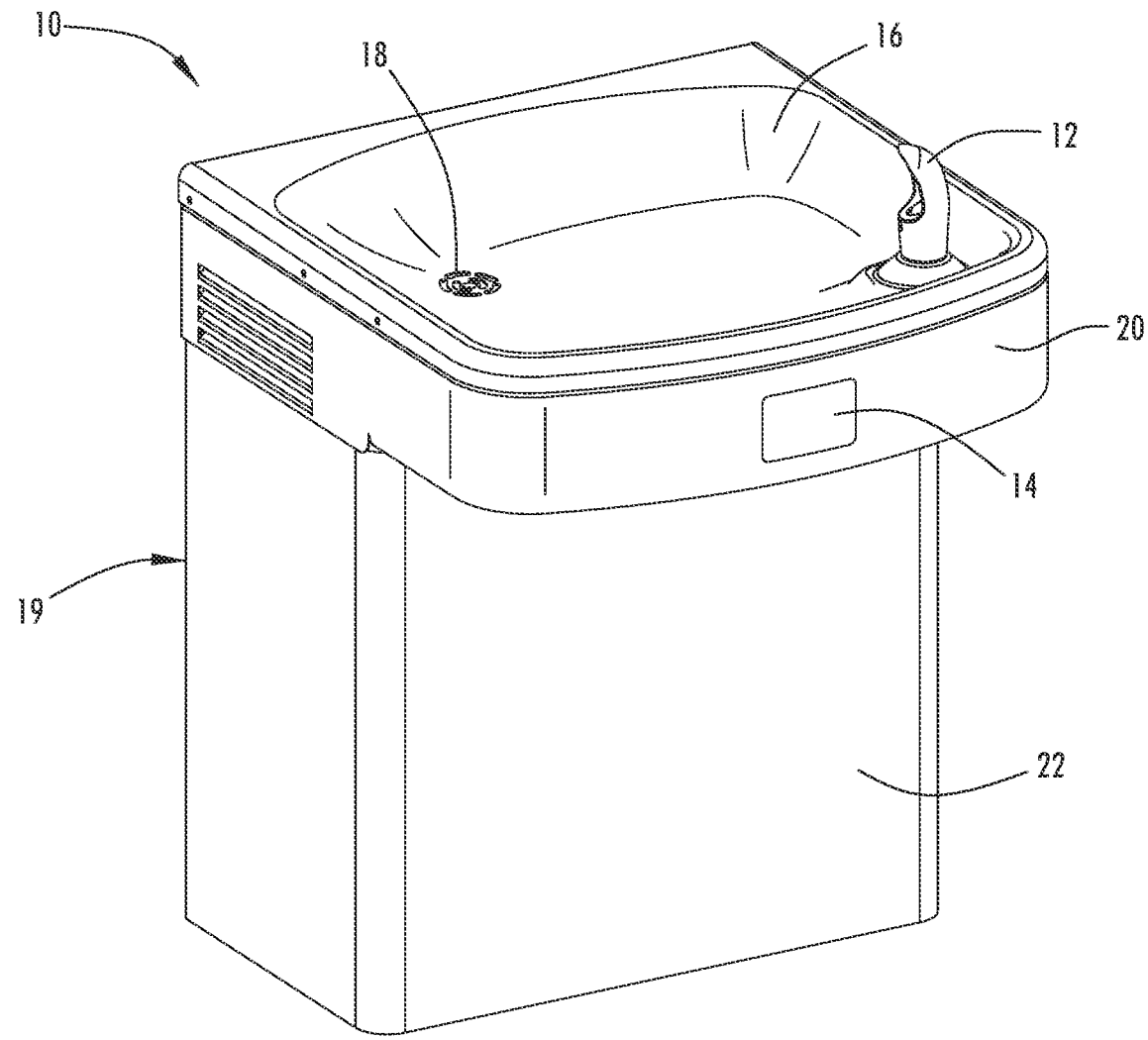
FIG. 1 is a perspective view of a water station incorporating the principles of the present invention.

As used in the description that follows, directional terms such as "upper" and "lower" are used with reference to the orientation of the elements as presented in the figures. Accordingly, "upper" indicates a direction toward the top of the figure and "lower" indicates a direction toward the bottom of the figure. The terms "left" and "right" are similarly interpreted. The terms "inward" or "inner" and "outward" or "outer" indicate a direction that is generally toward or away from a central axis of the referred to part, whether or not such an axis is designated in the figures. An axial surface is therefore one that faces in the axial direction, a direction along the central axis. A radial surface therefore faces radially, generally away from or toward the central axis. It will be understood, however, that in actual implementation, the directional references used herein may not necessarily correspond with the installation and orientation of the corresponding components or device.

Referring now to the drawings, a water station, hereafter "water station," embodying the principles of the present invention is generally illustrated in the figures and designated at 10. As seen in the figures, the water station 10 is shown as a drinking fountain. Being shown as a drinking fountain is for illustration purposes only and is not intended to limit the scope or application of the principles of the present invention. As will be appreciated, the principals of the present are equally applicable to other types of water stations, including, without limitation, water bottle filling stations, drinking glass filling stations, hand washing stations, etc.

As seen in the figures, the water station 10 includes a bubbler 12 that provides water on demand for drinking purposes. The bubbler 12 is a typical feature on drinking fountains, but would be omitted and replaced with a faucet or other water dispenser in other types of water stations 10. The on demand aspect of the water station 10 is achieved via a pushbutton 14 and valve assembly 15 (also seen in FIG. 5) connected to a water supply line (not shown) that is further coupled via an inlet connector (not shown) to a potable water source, such as a municipal water source (also not shown). The bubbler 12 provides the water upward and out over a basin 16, which collects the excess water and directs it to a drain opening 18 in the basin 16. Water from the drain opening 18 is collected in drain line (not shown) that may include a tailpipe coupled through a P-trap coupled to a waste pipe extending from a wall to which the water station 10 is mounted. Alternatively, the water station 10 may be free standing and both the water source and waste pipe may emerge from the ground or an alternate location 12. The various plumbing components of the water station 10 are enclosed in a housing 19, generally comprised of an apron 20, upon which the basin 16 is supported, a cover 22 and an under panel 23.

As seen in FIGS. 2 and 3, the under panel 23 is mounted to the apron 20 via support flanges 25, provided about the lower perimeter of the apron 20. The under panel 23 may be fixedly secured to the flanges 25 through various means, including spot welding or mechanical fasteners, such as rivets or screws.

The under panel 23 of the water station 10, as seen in FIG. 3, includes an opening 27 over which, from the exterior side of the under panel 23, is provided a cover plate 29. The cover plate 29 is removably secured to the under panel 23 over the opening 27 by fasteners 31 extending through mounting apertures 32 in the cover plate 29 and corresponding mounting apertures 32' in the under panel 23. Provided on the interior side of the under panel 23, at one end of the opening 29, is a latch bracket 33. The latch bracket 33 is further seen in FIG. 4 and further discussed below.

Figure 5:
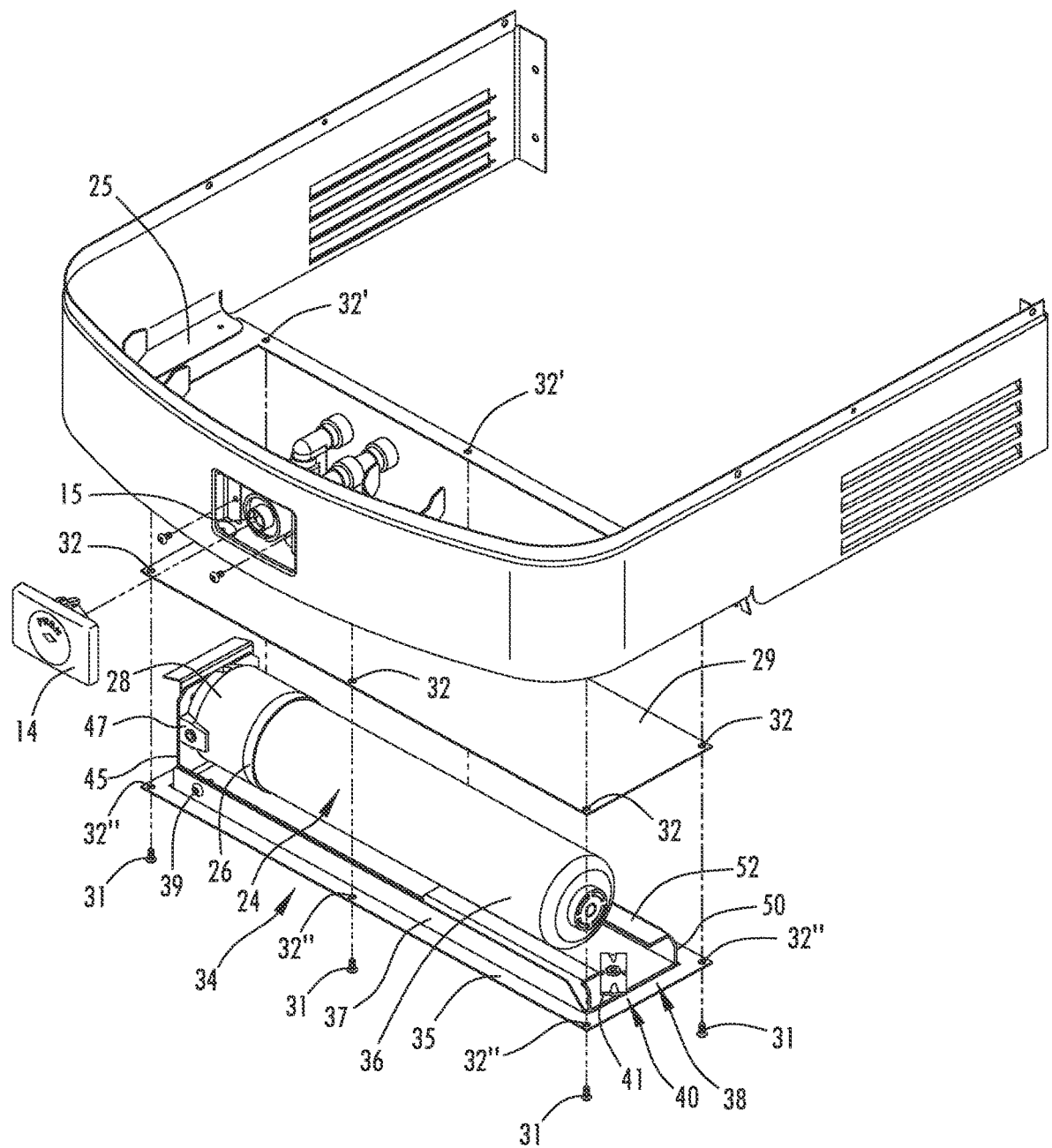
FIG. 5 is a perspective view of a portion of the water station seen in FIG. 1 showing cover plate and the filter kit for replacement thereof.

Referring now to FIG. 5, the cover plate 29 is illustrated in an exploded position relative to the under panel 23 and the opening 27. In registry with the cover plate 29, and also in an exploded position relative to the under panel 23 and opening 27, is a filter kit 34, which includes a filter assembly 24. The filter kit 34 is provided to enable a station 10 without a filter to be retrofitted and upgraded to a station 10 having a filter.

As such, the filter kit 34 includes a mounting frame 35 whose perimeter corresponds to the perimeter of the cover plate 29 and which includes mounting apertures 32" corresponding with mounting apertures 32 provided in the cover plate 29. To retrofit a station 10 with the filter kit 34, the fasteners 31 securing the cover plate 29 over the opening 27 are removed, along with the cover plate 29, and the filter kit 24 is secured to the under panel 23 using the same fasteners 31 inserted through the mounting apertures 32",32' of the mounting frame 35 and under panel 23, respectively.

With the cover plate 29 removed, the water supply line connected to the vale assembly 15 may be disconnected therefrom. Then, prior to or after securing of the mounting frame 35 to the under panel 23, the water supply line may be connected to the inlet port 32 of the filter assembly 24 and a jumper line (not shown) may be connected from the outlet port 34 of the filter assembly 24 to the inlet of the valve assembly 15. Thus, the filter assembly 24 is provided in-line with the water supply, upstream of the bubbler 12 or other water dispenser.

Preferably, the filter assembly 24 includes a screw-on, filter cartridge 36 in which both the inlet and outlet of the filter cartridge 36 are located centrally in a threaded coupling 26 on one end of the body of the filter cartridge 36.

The filter cartridge 36 is connected to the water supply line 15 through a filter hub 28 that includes a threaded coupling 30 that matingly engages the threaded coupling 26 of the filter cartridge 36. The filter hub 28 also includes the inlet and outlet ports 32, 34 mentioned above, which couple with the inlet and outlet of the filter cartridge 36 during engagement of the threaded couplings 26, 30 and provide for fluid communication between the filter hub 28 and the filter cartridge 36. Because of the threaded couplings 26, 30, the filter cartridge 36 is readily disconnected from the water supply line after its useful life and replaced with another filter cartridge 36.

The filter kit 34 is provided such that gaining access to the filter cartridge 36 is neither cumbersome nor inconvenient.

Figure 6:
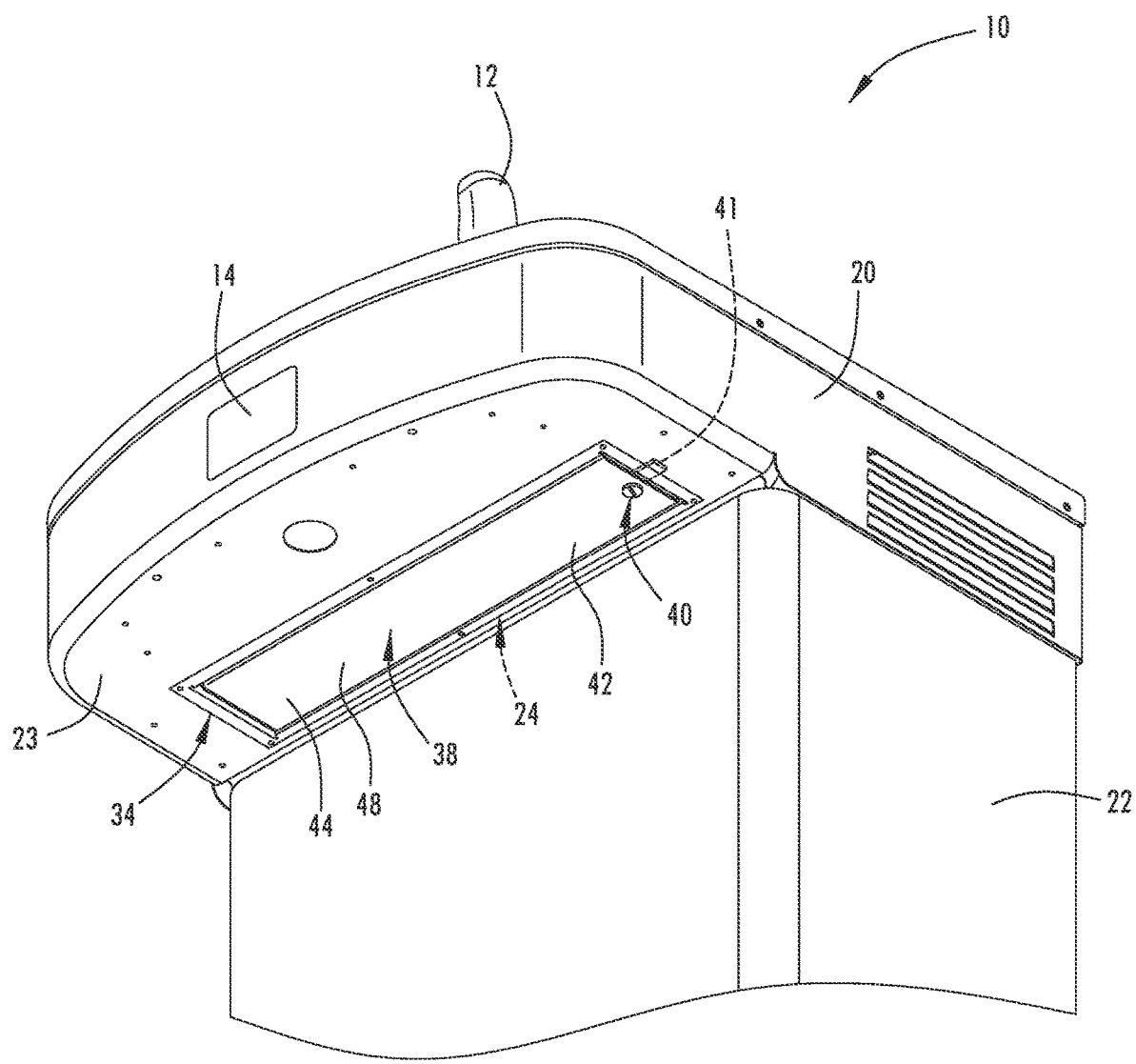
FIG. 6 is a perspective view of the underside of the water station and illustrates the filter kit attached to the under panel and in a closed position.
Figure 7:
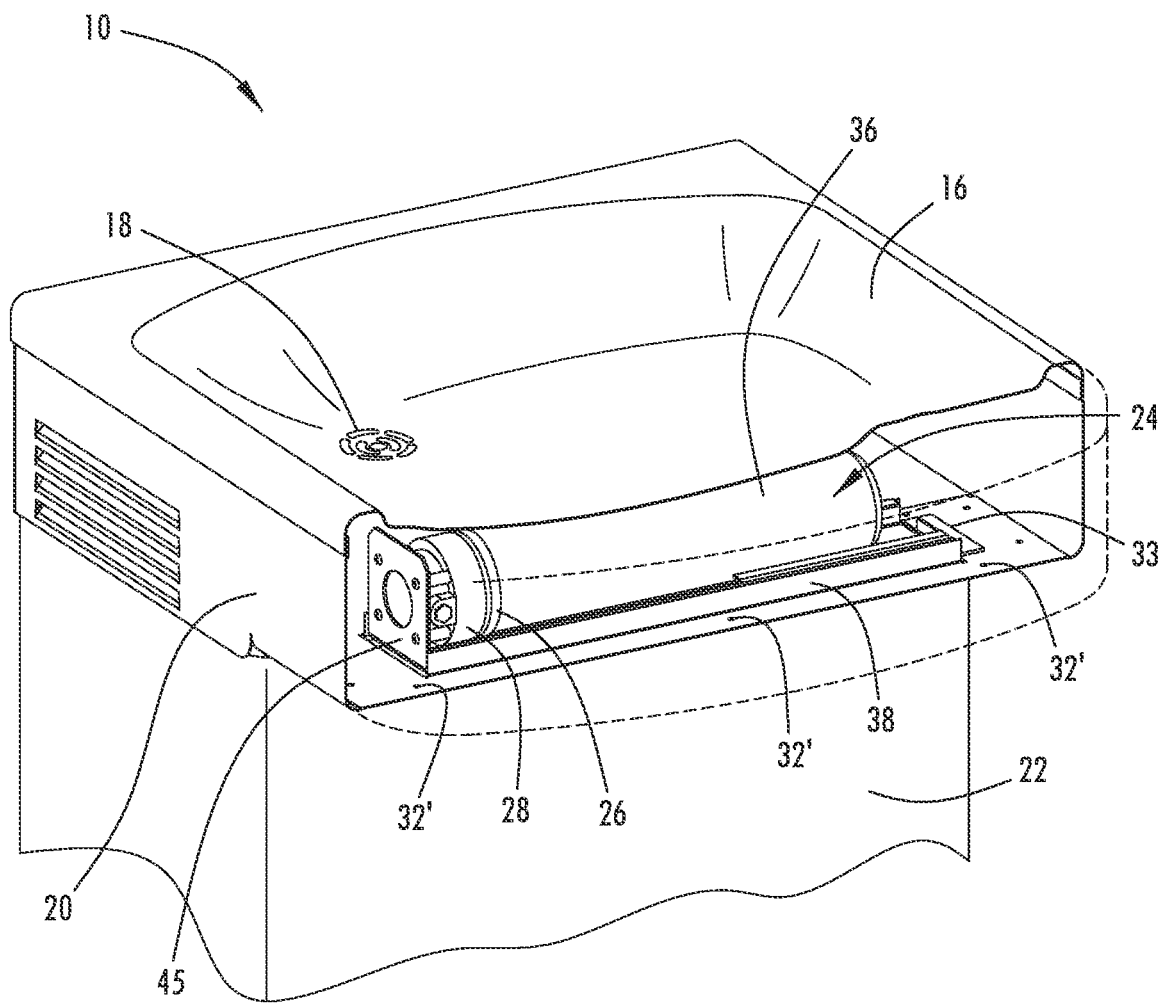
FIG. 7 is perspective view, with portions of the apron broken away, showing the installed filter kit.

Referring now to FIGS. 5-10, the filter kit 34 includes a door 38 that is hingedly connected at 39, via a rivet or other pivot connection means, at one end (proximal end 44) to an upstanding flange 37 of the mounting frame 35. At the opposing end (distal end 42) of the door 38 is provided with a latch mechanism 40, which may include a simple lock set. The latch mechanism 40 includes a latch 41 that is rotatable generally within the plane of the door 38 so as to engage within an opening 43 of the latch bracket 33, when the door 38 is closed, as generally seen in FIGS. 6 and 7.

The hinged connection 39 on the proximal end 44 of the door 38 allows the distal end 42 of the door 38 to swing downward into an open position when the latch mechanism 40 is opened/unlocked. The open position of the door 38 is seen in FIGS. 8, 9 and 10.

Figure 8:
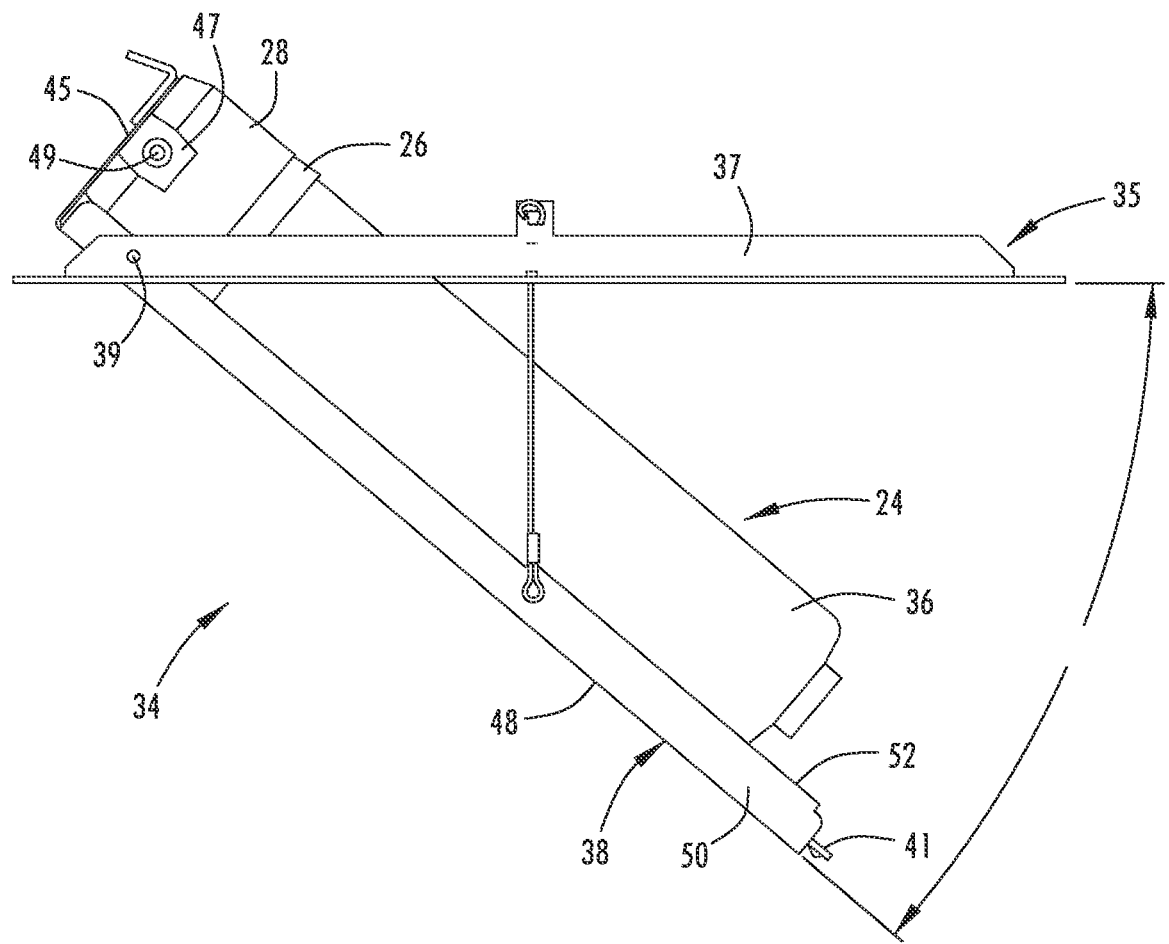
FIG. 8 is a side view of the filter kit with the filter door in an open position.

As seen in FIG. 8, the filter assembly 24 is carried by the door 38 and is pivoted downward, into an easily accessible position, when the door 38 is moved into its open position. To facilitate this movement, the filter hub 28 is mounted to an end bracket 45, formed perpendicularly on the proximal end 44 of the door 38. A variety of mounting means may be used to secure the filter hub 28 to the end bracket 45, including providing the end bracket 45 with mounting tabs 47 that are laterally positioned about and mechanically fastened to the filter hub 28.

Figure 10:
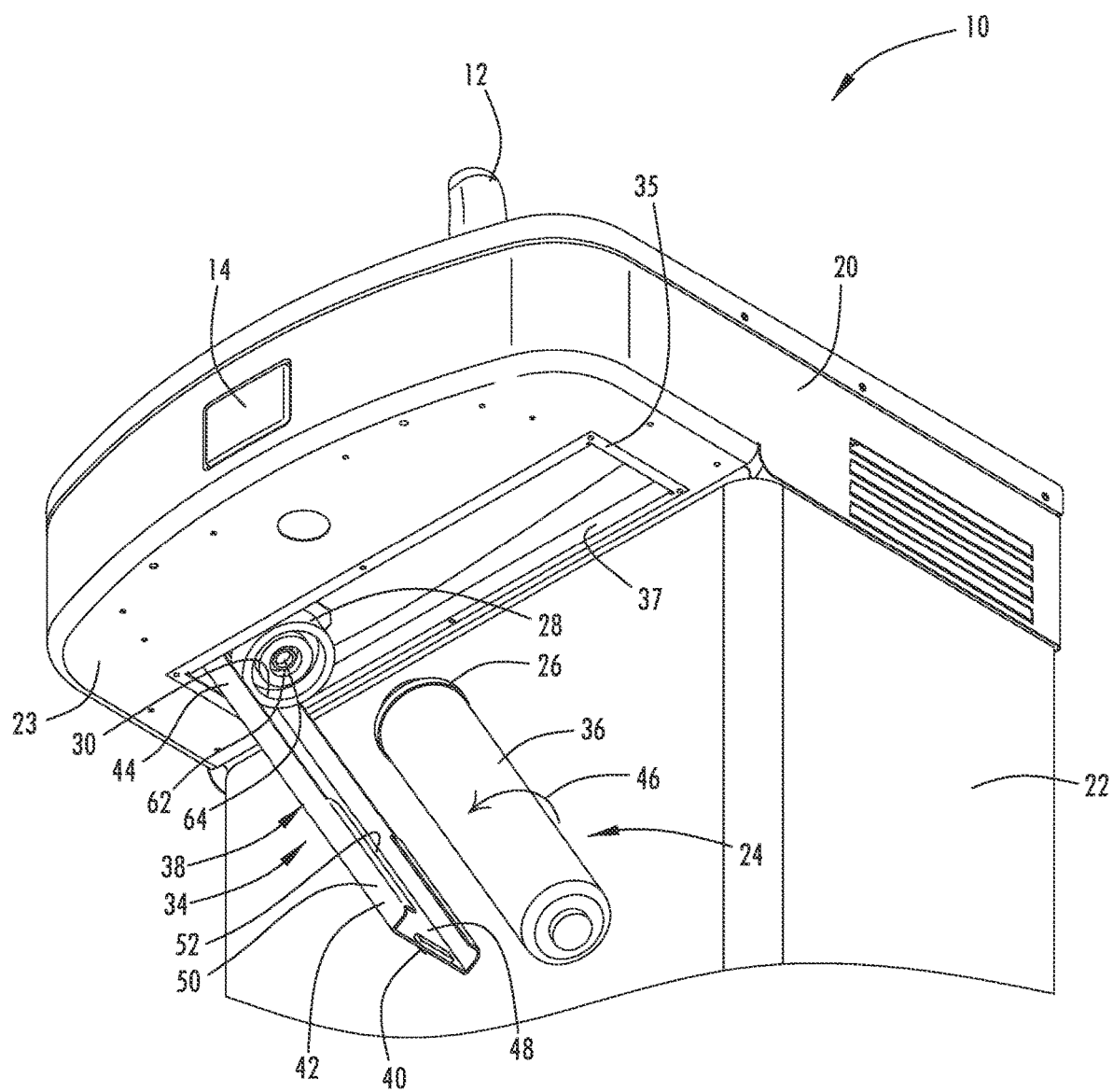
FIG. 10 is a perspective view similar to FIG. 9, with the filter removed from the open filter door.

To replace the filter cartridge 36, the door 38 is opened and the filter cartridge 36 is rotated counter-clockwise, as indicated by arrow 46 in FIG. 10, thereby unthreading the threaded coupling 26 of the filter cartridge 36 from the threaded coupling 30 of the filter hub 28. To install a replacement filter cartridge 36, the process is simply reversed and the new filter cartridge 36 is rotated clockwise, in a direction opposite to arrow 46, thereby threading the threaded coupling 26 of the filter cartridge 36 into engagement with the threaded coupling 30 of the filter hub 28.

Figure 9:
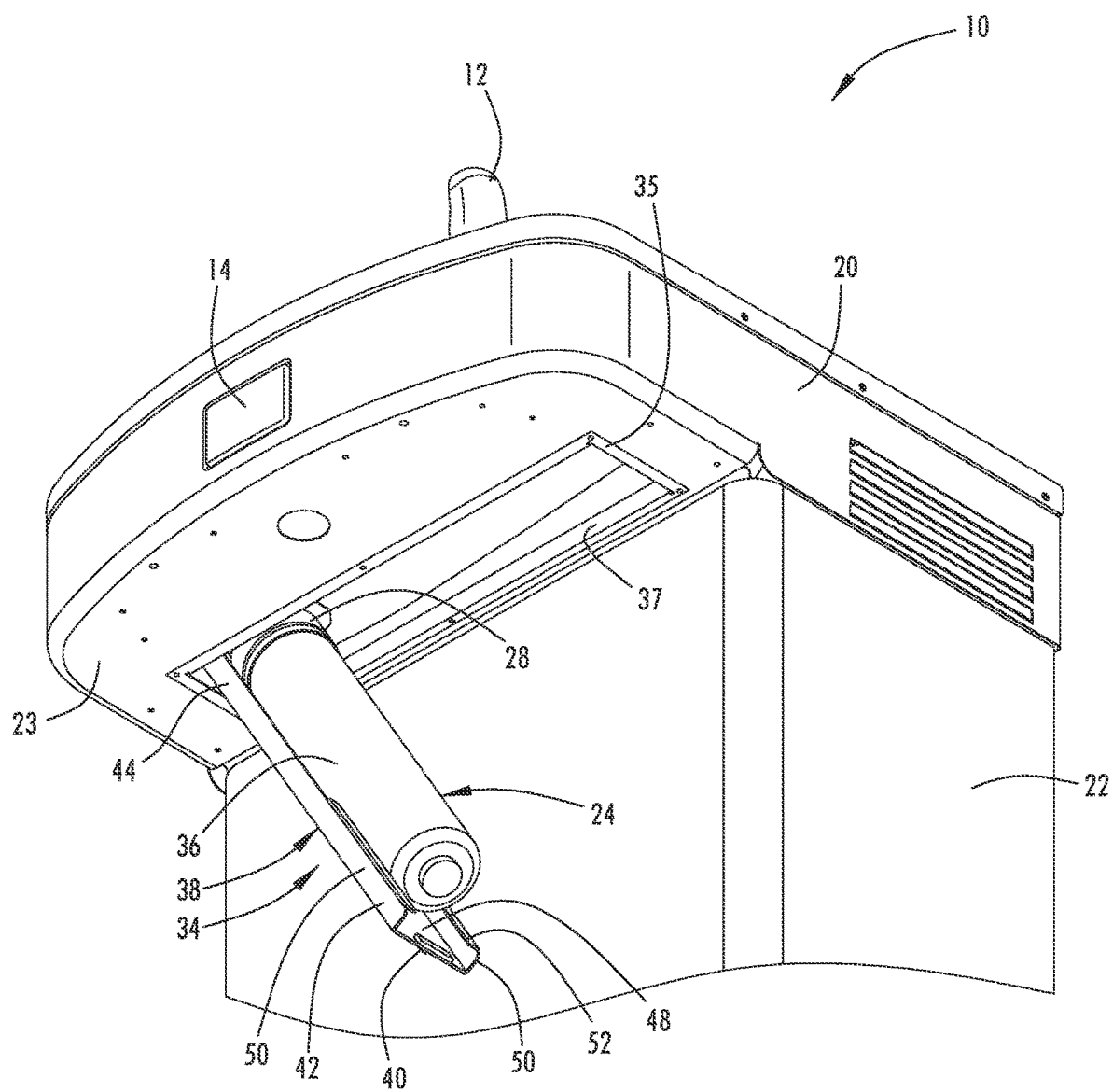
FIG. 9 is perspective view similar to FIG. 6 with the filter door in an open position.

As seen in FIGS. 8, 9 and 10, the door 38 includes a main panel 48 that defines a surface that is substantially flush with the under panel 23 when the door 38 is in the closed position. Along the lengthwise sides of the door 38, upright lateral flanges 50 are provided and, at the proximal end 44, the flanges 50 cooperate in defining the hinged connection As mentioned above, the end bracket 45 is provided at the proximal end 44 of the door 38 and is oriented 90 degrees relative to the main panel 48 so as to extend into the station 10 when the door 38 is in the closed position. The mounting tabs 47 of the end bracket 45 may correspond with bores defined in bosses or other features of the filter hub 28 and through which threaded fasteners 49 are inserted to engage within the bores and fixedly secure the filter hub 28 directly to the end bracket 45 and, therefore, the door 38.

At the distal end 42 of the door 38, the lateral flanges 50 are further formed with inwardly extending flange portions that define support shelves 52. The cartridge filter 36 may be received and supported on the support shelves 52 to reduce stress imparted to the threaded couplings 26, 30 when the door 38 is in the closed position. A damping element (not shown), such as a foam rubber or cork strip, may optionally be provided on the support shelves 52 to cushion the support of the filter cartridge 36 and minimize and vibrational noise that might otherwise result via contact between the body of the filter cartridge 36 and the support shelves 52.

The above description is meant to be illustrative of at least one preferred implementation incorporating the principles of the invention. One skilled in the art will really appreciate that the invention is susceptible to modification, variation and change without departing from the true spirit and fair scope of the invention, as defined in the claims that follow. The terminology used herein is therefore intended to be understood in the nature of words of description and not words of limitation.

I claim:

1. A water providing station having two states of installation, the station comprising:
   a housing;
   a basin supported by the housing;
   a water dispensing mechanism associated with the basin;
   a water supply line located within the housing and fluidly coupled to the water dispensing mechanism;
   an opening defined in the housing;
   a cover panel removably mounted over the opening in a first installation state, the water dispensing system having no filter associated therewith in the first installation state; and
   a filter kit, the filter kit including a door and filter assembly;
   wherein the filter kit is retrofittable with the cover panel and removably mounted over the opening in a second installation state thereby wholly replacing the cover panel, the filter assembly being coupled to the water supply line and being supported by and for movement with the door between open and closed positions of the door while remaining coupled to the water supply line and the water dispensing mechanism.

2. The water providing station according to claim 1, wherein the housing includes a plurality of mounting features located about the opening, the cover panel including a plurality of cover mounting features, the plurality of cover mounting features corresponding to the plurality of mounting features of the housing, the filter kit including a plurality of filter kit mounting features, the plurality of filter kit mounting features corresponding to the plurality of mounting features of the housing.

3. The water providing station according to claim 2, further comprising a plurality of fasteners, one of the plurality of fasteners extending through one of each the plurality of mounting features located about the opening and a corresponding one of each the plurality of cover mounting features in the first installation state, one of the plurality of fasteners extending through one of each the plurality of mounting features located about the opening and a corresponding one of each the plurality of filter kit mounting features in the second installation state.

4. The water providing station according to claim 1, wherein the cover panel extends completely over the opening in the first installation state.

5. The water providing station according to claim 1, wherein the filter kit extends completely over the opening in the second installation state.

6. The water providing station according to claim 1, wherein the cover panel extends completely over the opening in the first installation state and the filter kit completely extends over the opening in the second installation state.

7. The water providing station according to claim 1, wherein the filter assembly further includes a mounting frame, the door being mounted to the mounting frame.

8. The water providing station according to claim 7, wherein the filter assembly is fastened to a portion of the door.

9. The water providing station according to claim 8, wherein the filter assembly includes a filter hub and a filter cartridge, the filter hub being fastened to the door and the filter cartridge being removeable mounted to the filter hub.

10. The water providing station according to claim 7, wherein the mounting frame is configured for mounting to the housing and the door is pivotally engaged to the mounting frame.

11. The water providing station according to claim 10, wherein one end of the door is pivotally engaged to the mounting frame and an opposing end of the door is releasably engaged with the housing.

12. The water providing station according to claim 7, wherein the door includes a main panel defining an exterior surface, the exterior surface being substantially flush with an exterior surface of the housing in the closed position.

13. The water providing station according to claim 12, wherein the door includes an end bracket, the filter being fastened to the end bracket.

14. The water providing station according to claim 13, wherein the end bracket extends away from the main panel on a side of the main panel opposite from the exterior surface of the main panel.

15. The water providing station according to claim 7, wherein the door includes lateral flanges extending from the main panel, the door being mounted to the mounting frame through the lateral flanges.

16. The water providing station according to claim 7, wherein the mounting frame includes upstanding flanges extending therefrom, the door being mounted to mounting frame through the upstanding flanges.

17. The water providing station according to claim 1, wherein the perimeter of the cover panel is located outboard of the perimeter of the opening in the first installation state.

18. The water providing station according to claim 17, wherein the perimeter of the filter kit generally corresponds to the perimeter of the cover panel.

19. The water providing station according to claim 18, wherein the perimeter of the filter kit corresponds in size and shape to the perimeter of the cover panel.

20. The water providing station according to claim 1, wherein the perimeter of the filter kit is located outboard of the perimeter of the opening in the second installation state.

* * * * *